METHOD OF DETERMINING EXPOSURE VALUES FOR COLOR PRINTING

Filed Jan. 26, 1968 4 Sheets-Sheet 1

INVENTOR.
RUDOLF PAULUS

BY Michael S. Striker
Attorney

INVENTOR.
RUDOLF PAULUS

BY Michael S. Striker
Attorney

METHOD OF DETERMINING EXPOSURE VALUES FOR COLOR PRINTING

Filed Jan. 26, 1968 4 Sheets-Sheet 3

*INVENTOR.*
RUDOLF PAULUS

*BY* Michael S. Striker
Attorney

*INVENTOR.*
RUDOLF PAULUS

BY Michael S. Striker
Attorney 3,582,325

METHOD OF DETERMINING EXPOSURE VALUES FOR COLOR PRINTING

Rudolf Paulus, Munich, Germany, assignor to Agfa-Gevaert Aktiengesellschaft, Leverkusen, Germany Filed June 26, 1968, Ser. No. 740,262
Claims priority, application Germany, June 30, 1967, A 56,131
Int. Cl. G03c *7/16*
U.S. Cl. 96—23 7 Claims

ABSTRACT OF THE DISCLOSURE

Prints of color photographic negatives are obtained by scanning a finite number of unit areas on a negative to determine certain of its criteria for blue, green and red colors. Such criteria are compared with sets of reference criteria which are stored in a memory unit together with empirically determined optimum correction factors for each set of reference criteria. The comparison is made for the purpose of locating or selecting those correction factors which are best suited for adjustment of the exposure control in an automatic printer. The thus obtained information is fed to the exposure control not later than when the freshly scanned negative enters the printing station.

BACKGROUND OF THE INVENTION

The present invention relates to a method of determining exposure values for high-speed color printing. More particularly, the invention relates to improvements in a method of determining correction values for density and color failure.

The majority of presently employed color printers rely on neutral grey compensation (null principle). Thus, the ratio of color components of the printing light is regulated in such a way that, by disregarding the color density of the negative, the printing paper receives so much light in each of the three colors that the exposed print would exhibit a grey color upon uniform illumination of its photosensitive layers. Such mode of compensation is based on the recognition that an image is pleasing to the human eye if all of the colors are represented therein to the same or nearly the same degree. However, it was also discovered that the first outlined procedure can result in the production of satisfactory prints only if the negative, too, contains substantially equal proportions of blue, green and red light. If one of the colors dominates, it is suppressed in a printer which operates on the null principle, i.e., the other two colors are more pronounced than in the original so that the impression gained on observation of the print is quite different from that created by examination of the original.

In accordance with another known proposal, a selected color can be suppressed or emphasized by an operator who actuates control knobs on the panel of the printer or a separate machine. An experienced operator can make sure that the printer produces up to 80 percent of satisfactory first prints. The printing of the remaining 20 percent of negatives must be repeated under different circumstances. A drawback of the just outlined procedure is that it requires the presence of a highly qualified operator and also that the number of unsatisfactory first prints is excessive for an economical operation. Second printing of at least 20 percent of negatives involves considerable expenses in time, material and programming of the operation.

SUMMARY OF THE INVENTION

It is an object of the present invention to provide a fully automatic method of determining optimum exposure values for color printing so that the operator in charge of such determination in conventional color printers can be dispensed with.

Another object of the invention is to provide a method of automatically determining optimum correction values for density and color failure of color negatives.

The improved method of making prints from color photographic negatives comprises the steps of compiling sets of reference criteria for a variety of negatives and the optimum correction factors for each negative, photoelectrically scanning a preselected number of unit areas on a color negative whose image is to be reproduced on printing paper or a like carrier with a view to determine the criteria of such negative, comparing the thus determined criteria with the reference criteria to locate the closest set of reference criteria and the corresponding correction factors, and utilizing the thus located correction factors for reproduction of the image of the thus scanned negative.

The criteria preferably include the average transparency of the negative in each of the basic colors blue, green and red, and the frequency of average transparency in each color. The average transparency can be calculated on the basis of a predetermined range of transparencies, i.e., by disregarding extreme transparency values above and below such range. For example, the average transparency in each of the three colors can be calculated on the basis of a limited range of discrete transparencies; such range may include between 20 and 40 transparency values.

The number of unit areas which are scanned may be one of a range of numbers between 50 and 300. Good results can be achieved by scanning 100 unit areas of the negative.

If the negatives are scanned and their images reproduced in rapid succession, a preceding negative is located at a printing station while the next-following negative is being scanned at a station which is located upstream of the printing station.

The novel features which are considered as characteristic of the invention are set forth in particular in the appended claims. The printing apparatus itself, however, both as to its construction and its mode of operation, will be best understood upon perusal of the following detailed description of certain specific embodiments with reference to the accompanying drawing.

FIGS. *4a–4c* are diagrams whose curves illustrate the distribution of transparencies in selected unit areas of a negative, each curve representing the range of transparencies in a different color; and FIGS. *5a–5c* are graphs whose curves illustrate the frequency of average transparency values in the three colors.

DESCRIPTION OF THE PREFERRED EMBODIMENTS

The present invention is based on the recognition that it is possible to classify all types of normally occuring negatives into a finite number of categories or classes so that the negatives of each such class can be copied under identical circumstances. The main problem which is solved by the advent of the present invention is that of finding automatically determinable criteria (particularly such criteria which can be detected by photoelectric means) which render it possible to rapidly and reliably classify a series of randomly furnished negatives so as to insure that each such negative is copied under circumstances which are most likely to result in the production of a satisfactory print. A negative can be copied without making of test prints if its characteristics in each of the three colors are clearly identical, in all respects, with those of a sample negative or reference negative which is representative of a particular category or class. In order to insure such clear-cut identity between any one of a series of negatives and a sample negative or reference negative for a particluar class, it would be necessary to establish an excessively large number of classes, i.e., a number which would insure the production of satisfactory copies but would be totally impractical for a rational copying operation.

Figure 4A:
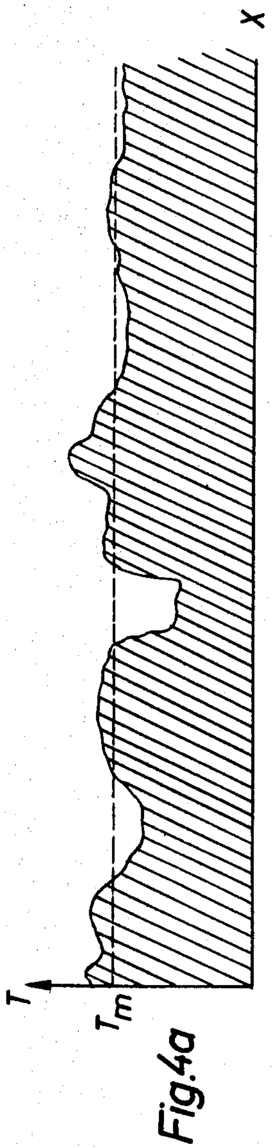
Figure 4B:
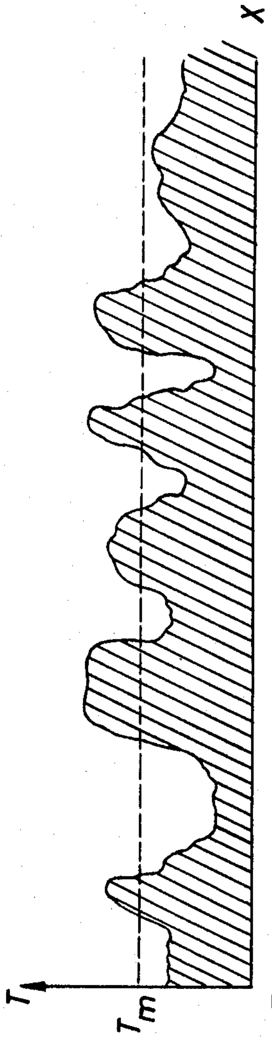
Figure 4C:
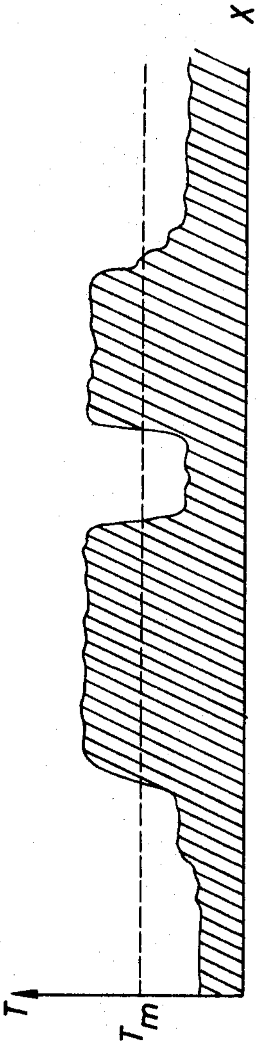

Referring first to FIGS. 4*a* to 4*c*, there are illustrated the transparency curves in three different basic colors of a negative. Such curves are obtained by scanning the negative, point-by-point, by photoelectric means. These figures show that the exact locale of measurement is of no consequence. Thus, a negative which is to be reproduced can be properly classified in one of a limited number of classes or categories if the number of points of a given density equals or approximates the number of points of same density on the sample negative or reference negative for a class. In other words, the frequency at which the points of a given density appear on a negative is of importance for proper classification of the negative, but the distribution of such points in the negative is of no consequence.

Figure 5A:
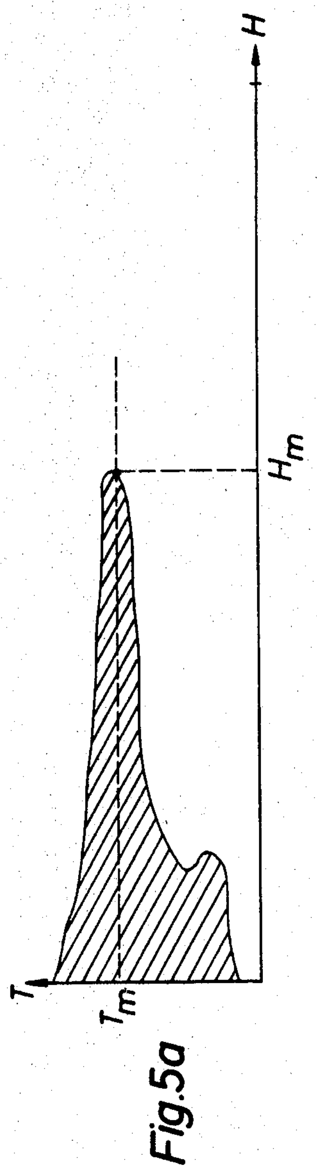
Figure 5B:
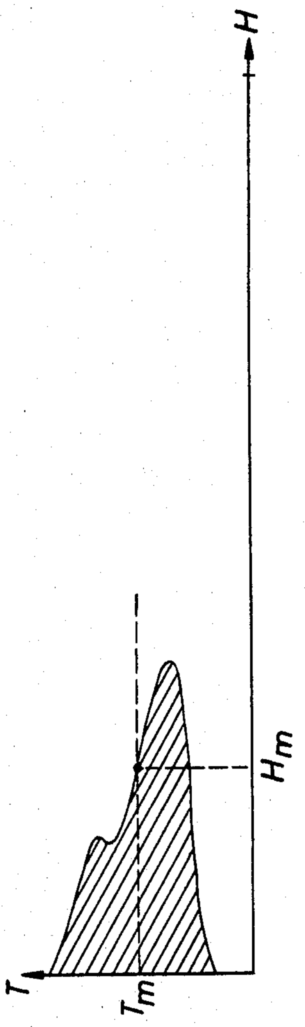
Figure 5C:
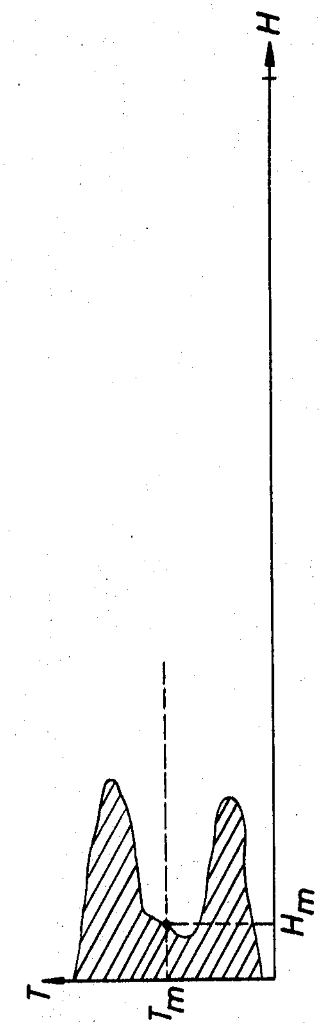

The hypothetical negative whose scanning yielded the curves of FIGS. 4*a*–4*c* was scanned at 32 different points. FIGS. 5*a*–5*c* illustrate curves which represent the frequencies of identical transparency values for the particular colors. The curve of FIG. 4*a* is representative of densities in blue color and it will be seen that the density deviates very little from an average density T*m*. The curve of FIG. 4*b* represents densities in green color and such densities deviate appreciably from the average density T*m*. The curve of FIG. 4*c* is indicative of densities in red color and it shows that the negative exhibits two dominant zones. This can be even more readily detected by looking at FIGS. 5*a*–5*c* which illustrate the distribution of points at which the measurements in the colors blue, green and red were carried out. Thus, FIG. 5*a* shows a narrow resonance-like distribution curve whereas the curve of FIG. 5*b* exhibits a short maximum and a relatively wide base. The distribution curve of FIG. 5*c* resembles the outline of a saddle because the red color has two dominant transparency values. In other words, the frequency of average density values is low if the negative exhibits a relatively large number of dominants (larger areas of a given color).

The main problem in presently known methods which are based on the neutral grey compensation principle is to distinguish between dominants of a negative which should be reproduced on the copy and faulty color shades which are caused by illumination, type of film and/or nature of copying paper. In the presence of dominants which deviate considerably from an average value, the relative frequency of the average value is low. Consequently, the present method contemplates determination of two important criteria of a color transparency, namely, the average transparency of the negative and the relative frequency of average transparency. These two criteria contribute considerably to proper examination and classification of negatives. If the two criteria for each of the three colors (i.e., a total of six criteria) are similar for two negatives, it is highly likely that both negatives can be copied under similar circumstances and will yield satisfactory prints.

In order to determine the average density or transparency and the relative frequency of points of average density or transparency, one can proceed in accordance with well known principles of data collection. It is important, however, that the area of portions which are scanned should not be too small because this would yield a very rough or irregular density curve and, consequently, a very rough (irregular) frequency curve. On the other hand, the scanned portions should not be too large because this would reduce the accuracy of measurement. It was found that the scanning of betwen 50 and 300 portions or points of a regular 36-millimeter negative (preferably about 100 points) will result in very satisfactory determination of aforementioned criteria. It suffices if the densities are compared with a scale of densities whereon the densities decrease or increase linearly, for example, with a scale of 32 different densities. The maximum and minimum densities (above and below the range of 32 densities) can be disregarded.

Figure 2:
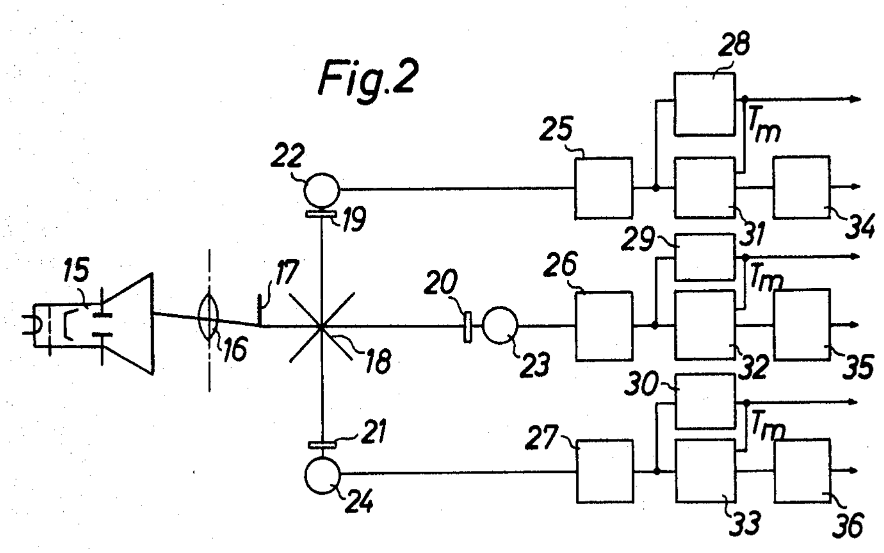
FIG. 2 is a schematic view of the scanning means in the printing apparatus.

FIG. 2 illustrates certain components of a scanning unit which can be utilized in the printing apparatus to scan a negative 17. A Braun tube 15 or an analogous cathode-ray oscilloscope tube sends white light through an objective lens 16 against portions of the negative 17. A dichroic beam divider 18 divides the light passing through such portions of the negative 17 into blue, green and red light. The beams of light pass through color filters 19, 20, 21 and reach secondary electron multipliers 22, 23, 24. The output signals of secondary electron multipliers 22–24 are transmitted to impulse discriminators 31, 32, 33 by way of analog digital converters 25, 26, 27 and counters 28, 29, 30. The counters 28–30 totalize the number of light signals and divide the number of signals by the number of measurements to furnish an average density or transparency value for the particular colors. Prior to the next-following scanning operation, the impulse discriminators 31–33 are adjusted in accordance with the determined average density values so that they transmit to counters 34, 35, 36 only such signals which are indicative of average density in the particular colors. Thus, on completion of two successive scanning operations, the counters 28–30 and 34–36 furnish six criteria of the scanned negative 17.

The apparatus of FIG. 2 can furnish the desired information within a very short interval of time. Since a color television picture with 625 times 625 dots can be scanned in 1/25 of a second, repeated scanning of a much smaller number of points on a negative requires a considerably shorter interval of time, i.e., much less than one second which is the time, required for copying of a negative which was scanned prior to the negative 17. It is clear that the apparatus of FIG. 2 constitutes but one of several apparatus which can be employed for scanning of negatives. By appropriate selection of scanning apparatus with a requisite number of counters, and by reducing the number of impulses and categories of reference negatives, one could plot the curves of FIGS. 5*a*–5*c* by simultaneously determining the peaks of such curves and their deviation from an average value.

The criteria obtained in the apparatus of FIG. 2 or an equivalent apparatus are then fed to a recording unit or memory unit which contains experimentally obtained information pertaining to all likely combinations of criteria and information pertaining to optimum correction factors for each combination of criteria. Such a memory unit can contain as many as 1,000 data each of which includes information (correction factors) for proper copying of a different negative. The memory unit can be built up or filled with information while the copying apparatus is in use. For example, one can start with a basic or primary memory unit which is preferably of the type wherein the information can be erased. Many types of memory units which are known from the art of computers can be employed in the apparatus of the present invention, for example, magnetic memory units, particularly magnet core units with appropriate recording and reading devices. The exact nature of the memory unit forms no part of the present invention.

When the memory unit is being furnished with data (calibrated), a negative is scanned in the aforedescribed manner and is thereupon assigned to one of the various categories. Such assignment corresponds to the classification of the recording and reading device in the memory unit. The person in charge of selecting filters in the printer is needed while the memory unit accumulates data pertaining to various categories of negatives; such person relies on his or her experience and feeds the requisite exposure values into the printer which is used for making of copies. Similar information is fed simultaneously to the memory unit for future reference. In other words, information pertaining to criteria for various types of negatives is stored side-by-side with information pertaining to proper exposure of such negatives. It is of advantage to apply to the reverse side of each negative not only such information which is indicative of corrections carried out during copying but also that information which is indicative of the criteria of the corresponding negative, at least while the basic memory unit receives data for future use. If the examination of developed prints reveals that the exposure was unsatisfactory and that the copying process must be repeated but with a different exposure, the orginally furnished data are erased and the memory unit receives different data indicating the nature of the exposure which is employed for renewed copying of a negative. This procedure is repeated as often as necessary, i.e., until the printer furnishes a satisfactory copy of the negative. The final information in the memory unit is collected over a certain period of time and such final information can be fed to other memory units of similar design each of which can be used in connection with a separate printer. It is important to design the memory units in such a way that they can furnish information without delay, i.e., that they can furnish data with a dispatch necessary to avoid delays in making of copies on account of the time spent for determination of appropriate data for an exposure with a particular type of negative. Memory units which employ magnetic tape, as well as the aforementioned core magnet memory units, were found to be particularly suited in the practice of the present invention.

If desired, all of the data stored in a memory unit which is provided with means for erasing the information stored therein can be transferred into a unit for permanent storage of information, for example, into a unit which stores information on a photosensitive layer whose transparency values in the particular colors are indicative of the data accumulated on scanning and reproduction of various categories of negatives. Such a permanent memory unit can be filled with information by a color television set which transfers information from magnetic tape to the photosensitive strip. Additional records of the information can be obtained by contact printing from the exposed photosensitive strip.

Figure 3:
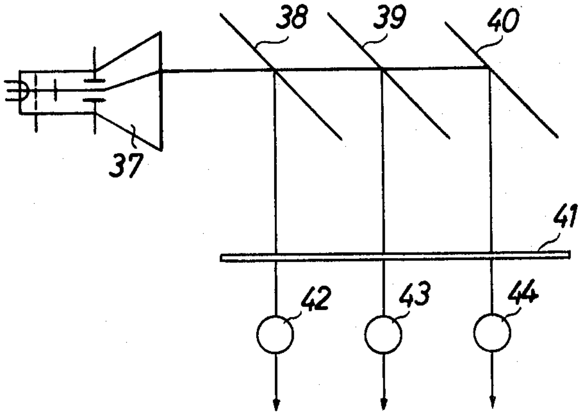
FIG. 3 is a schematic view of the means for comparing the criteria compiled by the scanning means with sets of criteria stored in a memory unit.

The manner in which information stored on a photosensitive web or strip of the memory unit can be compared with information obtained on scanning of a negative, and in which the exposure control of a printer can be adjusted in accordance with information furnished by the memory unit is shown in FIG. 3. A Braun tube 37 emits white light against a series of light dividing mirrors 38, 39, 40 which deflect light in the corresponding colors against an optical memory unit here shown as a color film 41 which contains information pertaining to exposures with different classes of negatives. Light which is modulated by the varying transparency of the film 41 reaches secondary electron multipliers 42, 43, 44 which convert the corrective values for exposure into three signals and transmit such signals to the exposure control 13 (FIG. 1) of the printer. Thus, the secondary electron multipliers 42–44 serves as a means for adjusting the exposure control. The voltages applied to the control electrodes of the tube 37 depend on the criteria of the negative which requires copying. In this way, the criteria of the negative can directly influence the emission of the light beam which scans the film 41. The latter can be readily exchanged, for example, at the end of the summer season or at the end of the winter season, when one expects to obtain a relatively large number of certain classes of negatives.

The film 41 of FIG. 3 is such that the information for exposures in each of the three basic colors is stored at a different point. However, it is equally possible to employ a film with three layers of photosensitive material and to place such film directly against the screen of the tube 37. The arrangement of mirrors 38–40 and secondary electron multipliers 42–44 can remain unchanged.

Figure 1:
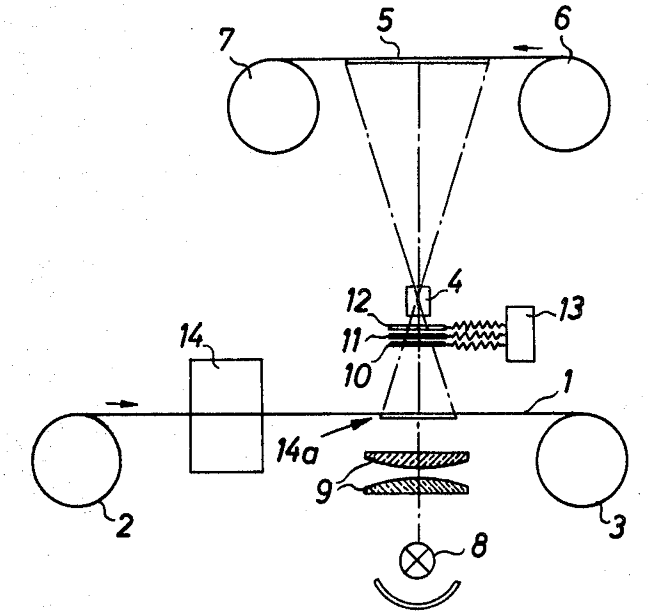
FIG. 1 is a schematic partly sectional view of a printing apparatus for the practice of a method which embodies the invention.

FIG. 1 illustrates a printer for making copies from roll film 1 which is paid out by a supply reel 2 and is collected by a takeup reel 3. The scanning station is shown at 14 and the copying station at **14*a*. That negative which is located at the station 14*a* extends across the path of light issuing from a light source 8 and passing through a condensor 9. Three color filters 10, 11, 12 are provided in a filter drawer and can be moved into or away from the path of light which has passed through the negative at the station 14*a*. The filters 10–12 are movable by the adjustable exposure control circuit 13 and are located in front of an objective 4 which focusses the image on printing paper 5 supplied by a reel 6 and collected by a reel 7. The scanning station 14 accommodates the structure of FIG. 2 or an analogous structure which scans the next-following negative while the apparatus reproduces the image of the negative which is held at the station 14*a*. The station 14 also accommodates the memory unit which furnishes the necessary information for adjustment of the exposure control circuit 13** so that the latter is properly adjusted and determines the exposure time in each of the three colors.

The construction of the printer can be simplified still further if the tube (corresponding to the tube 15 of FIG. 2) which scans the negatives is the same tube (corresponding to the tube 37 of FIG. 3) which is used to obtain information from the memory unit. This can be achieved by employing a mirror which is moved across the path of light upon completion of the scanning operation to thereby direct light to the mirrors 38–40. It is also possible to employ the secondary electron multipliers 22–24 as a means for reading or interpreting information obtained on scanning of the film 41, i.e., the multipliers 22–24 can also perform the functions of the multipliers 42–44. All that is necessary is to effect appropriate adjustment of the evaluating means.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Method of determining color correction factors for making in an automatic printer prints from color photographic negatives, comprising the steps of (1) photoelectrically scanning a first negative at a substantial number of points whose total number is less than 301 and determining the average transparency at those points in each of three basic colors and the frequency of points having such average transparency calculated in each of said colors from a substantial number of median points scanned, and recording these criteria;

(2) selecting appropriate filter means and/or exposure parameters for the first negative and using them to make corrected prints until obtaining a satisfactory one;

(3) recording the correction factors finally used in the step (2), together with the criteria obtained in the step (1);

(4) repeating the steps (1), (2) and (3) with a series of negatives; and (5) utilizing the recorded correction factors associated with the same recorded criteria for influencing the characteristics of printing light during simultaneous reproduction of all areas of subsequent negatives.

2. Method as defined in claim 1, wherein said correction factors include correction factors for the three basic colors and the density of the color negative.

3. Method as defined in claim 1, further comprising the step of photoelectrically scanning a second negative of said subsequent negatives during reproduction of all areas of the preceding negative of said subsequent negatives.

4. Method as defined in claim 1, wherein said average transparency is determined on the basis of a predetermined range of transparencies.

5. Method as defined in claim 1, wherein said average transparency is determined on the basis of a range of discrete transparencies.

6. Method as defined in claim 5, wherein said range includes between 20 and 40 transparencies.

7. Method of determining color correction factors for making in an automatic printer prints from color photographic negatives, comprising the steps of (1) photoelectrically scanning a first negative at a substantial number of points whose total number is less than 301 and determining the frequency of identical transparency values at those points in each of three basic colors, the average transparency, and the extent of deviation of most frequently occurring identical transparency values from the average transparency in each of said colors, and recording these criteria;

(2) selecting appropriate filter means and/or exposure parameters for the first negative and using them to make corrected prints until obtaining a satisfactory one;

(3) recording the correction factors finally used in the step (2), together with the criteria obtained in the step (1);

(4) repeating the steps (1), (2) and 3) with a series of negatives; and (5) utilizing the recorded correction factors associated with the same recorded criteria for influencing the characteristics of printing light during simultaneous reproduction of all areas of subsequent negatives.

References Cited

UNITED STATES PATENTS

| | | | |
|---|---|---|---|
| 2,529,975 | 11/1950 | Smith | 96—23 |
| 2,571,697 | 10/1951 | Evans | 96—23 |
| 2,842,610 | 8/1954 | Crossfield et al. | 96—23X |

OTHER REFERENCES

C. J. Bartleson and R. W. Huboi, Exposure Determination Methods for Color Printing: The Concept of Optimum Correction Level; Journal of S.M.P.T.E., vol. 65; April 1956.

NORMAN G. TORCHIN, Primary Examiner

A. T. SURO PICO, Assistant Examiner